United States Patent [19]

Rankin

[11] 3,983,432

[45] Sept. 28, 1976

[54] BRUSH HOLDER ASSEMBLY

[76] Inventor: Alexander Rankin, 1720 Penns Lane, Ambler, Pa. 19002

[22] Filed: Apr. 22, 1975

[21] Appl. No.: 567,720

[52] U.S. Cl. .............................................. 310/242
[51] Int. Cl.[2] .......................................... H02K 13/00
[58] Field of Search ........................... 310/239–242, 310/244–249, 229, 230–237

[56] References Cited

UNITED STATES PATENTS

| | | | |
|---|---|---|---|
| 3,271,605 | 9/1966 | Drabik | 310/239 |
| 3,430,084 | 2/1969 | Hall | 310/242 |
| 3,430,915 | 3/1969 | Vogelsberg | 310/245 |
| 3,518,475 | 6/1970 | Sebok | 310/245 |

*Primary Examiner*—R. Skudy
*Attorney, Agent, or Firm*—Stanley B. Kita

[57] ABSTRACT

A brush holder assembly which affords ready removal and replacement of brushes is disclosed. The assembly comprises a guideway in a housing for slidably receiving a brush holder, latching means on the guideway and holder to secure the holder with the brush in operating relation in the housing, and means displaceable between the holder and the guideway from outside the housing to unlatch the holder to permit the brush and spring carried thereby to be withdrawn from the housing.

9 Claims, 5 Drawing Figures

BRUSH HOLDER ASSEMBLY

The present invention relates to brush holder assemblies for electric machines such as motors, generators, alternators, etc.; and more particularly, the present invention relates to brush holder assemblies which afford removal and replacement of the brushes without requiring disassembly of the electric machine.

Over the years, motors and generators have been provided with brushes which are urged into contact with their armatures by means of compression springs engaging the outer ends of the brushes. The springs force the brush radially inward with sufficient pressure to ensure good electrical contact between the brush and the armature. Although this construction may be satisfactory for certain applications, it is known that as the brush wears, the spring expands, and the force applied axially to the brush decreases with increasing use of the motor. Accordingly, this type of brush-mounting arrangement has not been entirely satisfactory.

In order to eliminate the drawbacks resulting from the use of helical compression springs, so-called constant-force springs have been developed. These springs apply a constant pressure to the brush, so that the same contact pressure exists irrespective to brush wear. A typical spring is fabricated of flat spring steel and has double spiral coils interconnected by a web which extends along the sides of the brush and engages the outer end of the brush. The coils normally engage surfaces confronting the armature and react against the surfaces to force the brush inwardly. The brush is installed by pushing it radially outward of the armature to uncoil the spring coils, and thereafter the armature is slipped into position between the brushes. These springs have the advantage of providing a constant force on the brushes; however, they suffer the disadvantage of requiring disassembly of the motor to afford access into its interior to remove and replace the brushes. Needless to say, removal and replacement of brushes mounted in this manner is a time-comsuming operation, even by skilled mechanics.

With the foregoing in mind, it is a primary object of the present invention to provide a novel brush holder assembly for an electric machine.

It is another object of the present invention to provide an improved brush holder assembly which affords removal and replacement of brushes from outside the housing of an electric machine.

As a further object, the present invention provides an unique brush holder assembly which permits brushes and constant-force springs associated therewith to be initially installed in an electric machine and dismounted therefrom readily with a minimum of labor.

Yet another object of the present invention is to provide a relatively simple brush holder which is inexpensive to manufacture.

More specifically, the present invention provides a brush holder assembly for use in an electric machine which has a housing rotatably mounting an armature engaged by at least one brush urged into engagement with the armature by spring means. The brush holder assembly comprises means providing a guideway in the housing to afford access to the armature from a location outside the housing, a brush and spring holder displaceable relative to the guideway toward and away from the armature, latching means associated with the guideway and the holder for cooperating therewith automatically to secure the holder in the guideway upon displacement of the holder inwardly into a seated position with the brush operatively engaged with the armature, and operator means which can be manipulated from a location outside of the housing for cooperating with the latching means to unlatch the holder from the guideway to afford removal of the holder and brush for the motor housing.

These and other objects, features and advantages of the present invention should become apparent from the following description when taken in conjunction with the accompanying drawings, in which.

Figure 1:
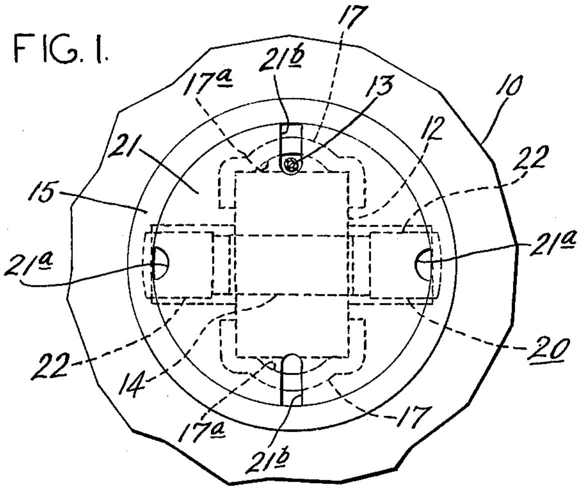
FIG. 1 is a fragmentary plan view of the housing of an electric machine having a brush holder assembly embodying the present invention.

Referring now to the drawing, there is illustrated in Fig. 1 the outside of a housing 10 of an electric machine, in the present invention instance an electric motor. The motor 10 has an armature 11, indicated in broken lines in Fig. 2, mounted for rotation in the housing 10. A brush 12 engages the armature 11 and is mounted in the housing 10 to supply current to the armature 11 through a lead 13 connected to the brush and to a source of electrical energy in a well known manner.

The brush 12 is urged into engagement with the periphery of the armature 11 by means of a constant force spring 14 such as manufactured by Vulcan Spring and Manufacturing Co., of Huntington Valley, Pennsylvania. The spring 14 has a pair of spiral coils **14*a*, 14*a* connected together by a web 14*b* which extends along opposite edges of the brush 12 and across the outer end 12*a* of the brush 12. The spring 14 functions to apply a constant force in the direction indicated by the arrow in Fig. 2 to urge the inner end 12*b* of the brush 12 against the armature 11**.

Figure 3:
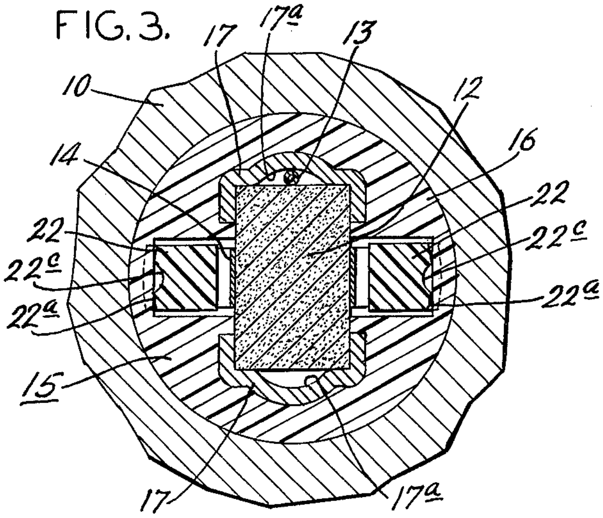
FIG. 3 is a sectional view taken along lines 3—3 of Fig. 2.

In accordance with the present invention, the brush 12 is mounted in the motor housing 10 by a holder assembly which affords ready removal and replacement of the brush 12 from a location outside of the housing 10. To this end, guideway means 15 of electrically insulated material is secured in the housing 10 above the armature 11 and provides an access opening **15*a* to the armature through the housing 10. As best seen inn Fig. 3, the guideway 15 comprises a tubular plastic insert 16 which mounts a pair of U-shaped metallic inserts 17, 17 which engage opposite sides of the brush 12 and extend therealong to a position adjacent the periphery of the armature 11 below the coils 14*a*, 14*a* of the spring 14. Both inserts, such as the upper insert 17 in Fig. 3, have lengthwise recesses 17*a* which permit the lead 13 to extend upwardly alongside either side of the brush. The metallic inserts 17, 17 function to guide the brush 12 and to conduct heat away from the brush 12 and the spring 14 during operation of the motor 10.**

Figure 2:
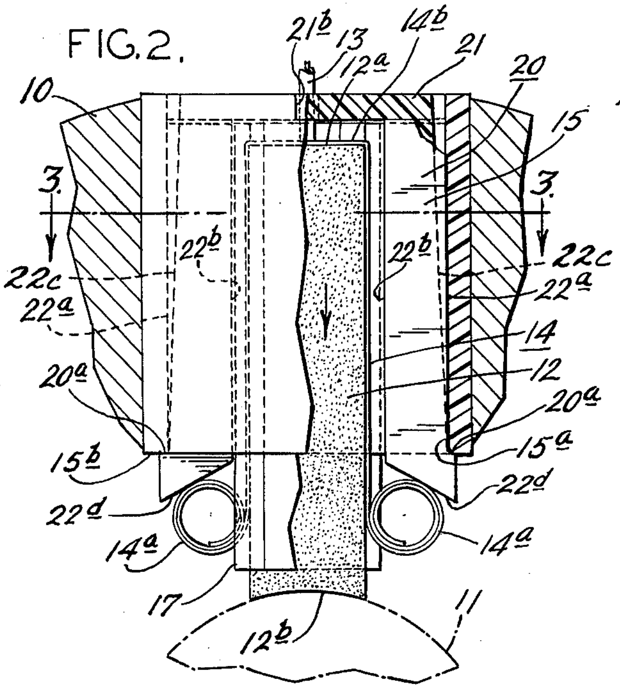
FIG. 2 is a side elevational view of the brush holder assembly illustrated in Fig. 1 with a portion of the assembly being broken away and sectioned to illustrate the cooperation of the various elements when the holder assembly is mounted in operating relation in the housing.

The brush holder assembly comprises a holder 20 which is designed to cooperate with the guideway insert 15 to latch the brush 12 and spring 14 automatically in operating relation in the housing 10 when the holder 20 is pushed inwardly toward the armature 11. As best seen in Fig. 2, the latching means is provided by a continuous inwardly facing surface 15*b*, provided on the lower periphery of the guideway 15, and a pair of outwardly facing surfaces 20*a*, 20*a* which engage the guideway surface 15*a* to prevent movement of the holder 20 in the outward direction as the spring 14 applies a force inwardly onto the brush 12. In the illustrated embodiment, the holder 20 has a base 21 and a pair of legs 22, 22 depending therefrom to define an inverted U-shaped structure having a brush-receiving recess between the legs. The legs 22, 22 are elongated and have opposite edge surfaces 22*a*, 22*a* inset from the upwardly facing latch surfaces 20*a*, 20*a*. The legs 22, 22 have inside edge surfaces 22*b*, 22*b* which confront one another and which are spaced apart a sufficient distance to loosely receive the brush 12. The lower ends of the inner surfaces 22*b*, 22*b* have outwardly-inclined portions 22*d*, 22*d* which confront one another and which engage the coils 14*a*, 14*a* of the spring 14 as illustrated in Fig. 2. Preferably the holder 20 is fabricated of a resilient electrical insulating material such as plastic which permits the lower ends of the legs 22, 22 to deflect resiliently toward and away from one another.

Preferably, the spacing between the confronting surfaces 22*b*, 22*b* on the insides of the legs 22, 22 is slightly greater than the width of the brush 12 by an amount equal to at least the extent of the width-wise dimension of the brush plus the lateral extent of the latching surfaces 20*a*, 20*a*. Thus, the brush 12 and the spring 14 may be installed in the motor 10 simply by squeezing the legs 22, 22 together and pushing the holder 20 downward in the guideway 15 until the latch surfaces 15*b* and 20*a* engage one another in the manner indicated in Fig. 2. A clicking sounds occurs to indicate that the brush 12 is properly seated in the housing 10. With the holder 20 thereby seated, the spring 14 urges the brush 12 downwardly into contact with the periphery of the armature 11.

During the course of operation of the motor 10 the inner end 12*b* of the brush 12 wears, and ultimately substantially the entire length of the brush is consumed. Accordingly to the present invention, operator means displaceable inwardly relative to the housing 10 is provided for unlatching the holder 20 to afford removal of the holder 20 and the brush and spring 14 from the outside of the motor housing 10. To this end, the outer edge surfaces 22*a*, 22*a* of the legs 22, 22 of the brush holder 20 each have a longitudinally-extending groove 22*c* providing a cam surface which tapers outwardly in a downward direction from the base 21. In other words, as best seen in Fig. 5, the groove 22*c* becomes shallower as it approaches the latching surface 20*a* near the bottom of the leg 22.

Figure 4:
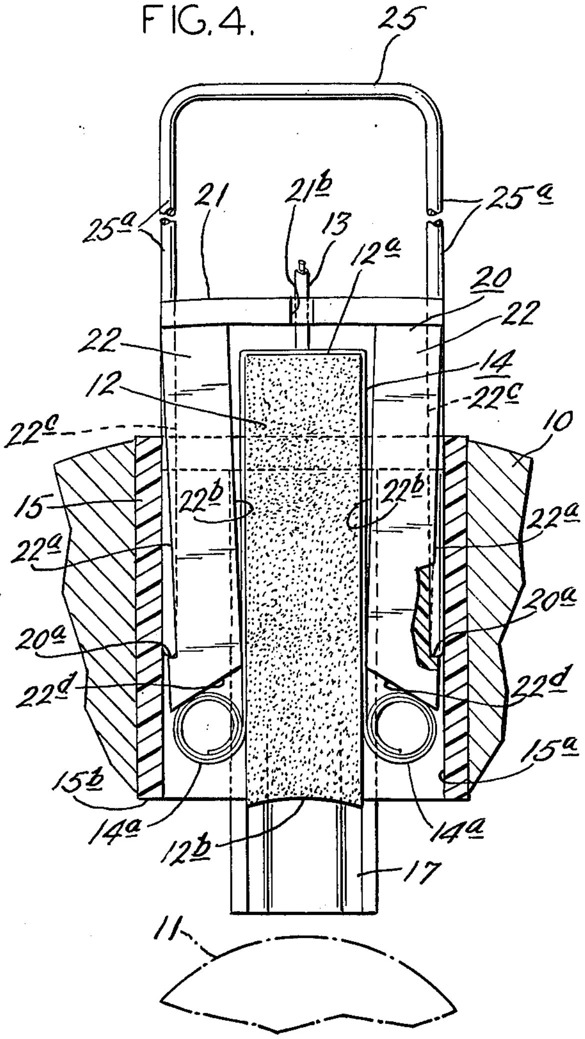
FIG. 4 is a view similar to Fig. 2 but illustrating the brush holder assembly during removal of the brush from the housing.

An operator or tool 25 (Fig. 4) which is preferably a U-shaped wire form 25 having a pair of depending legs 25*a*, 25*a* is provided to unlatch the latching surfaces. The legs 25*a*, 25*a* have a sufficiently small cross section to be received in the upper ends of the grooves 22*c*, 22*c*; however, because of the taper of the grooves 22*c*, 22*c*, the legs 25*a*, 25*a* function to displace the holder legs 22, 22 inwardly toward one another as the tool 25 is pushed axially inward toward the armature 11. Movement of the holder legs 22, 22 causes the surfaces 20*a*, 20*a* thereof to move laterally and to disengage the latching surface 15*a* of the guideway 15. This also causes the inner surfaces 22*b*, 22*b* of the legs 22, 22 to engage the sides of the brush 12 to grip the same; so that when the tool 25 is pulled upwardly, the holder 20, the spring 14, and the brush 12 are withdrawn from the guideway 15 as a unit. The brush 12 may then be removed from the holder 20 and be replaced with a new brush. The new brush may then be inserted in the motor 10 simply by pushing the holder 20 downwardly until it seats in the guideway 15.

Figure 5:
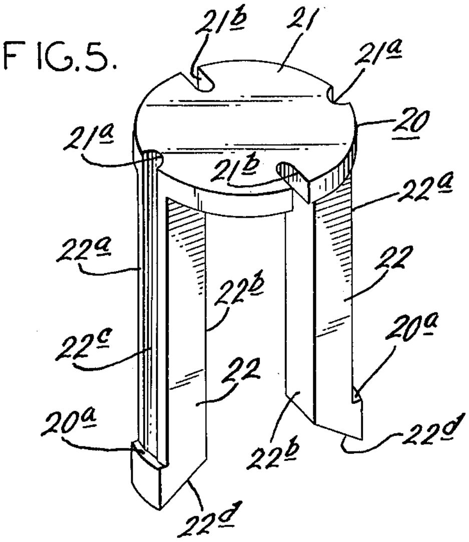
FIG. 5 is a perspective view of a preferred form of the brush holder of the present invention.

As best seen in Fig. 5, the base 21 of the brush holder 20 has a circular transverse cross-section with a pair of recesses 21*a*, 21*a* in registry with the grooves 22*c*, 22*c* in the legs 22, 22. The base 21 also has a pair of notches 21*b*, 21*b* either of which receives the brush lead 13. Thus, when the holder 20 is mounted in the motor 10 as illustrated in Fig. 2, the base 21 overlies the outer end 12*a* of the brush 12 and provides a closure for the access opening provided by the guideway 15 to prevent dirt and foreign matter from entering the motor and to minimize electric shock hazard.

In view of the foregoing, it should be apparent that brushes in electric machines such as motor generators, alternators, etc. may be installed and/or removed and replaced relatively rapidly, with a minimum of labor.

While a preferred embodiment of the present invention has been described in detail with reference to a brush radially-engaging an armature, it should be apparent that the present invention may also be used effectively with respect to brushes which engage armatures in an axial direction. Accordingly, various modifications, alterations and changes may be made without departing from the spirit and scope of the present invention as defined in the appended claims.

I claim:

1. In an electric maching having a housing, an armature rotatable in said housing, at least one brush engaging the armature, and spring means urging said brush into engagement with said armature, the improvement comprising:

guideway means in said housing providing an access opening to said armature from outside said housing, a brush and spring holder received in said guideway means and being displaceable inwardly toward and outwardly away from said armature, releasably engaging latching surfaces on said guideway means and said holder, resilient means mounting at least one of said latching surfaces for movement laterally out of engagement with the other, and means providing a camming surface on said resilient means for cooperating with said guideway means to define therebetween an inwardly and laterally narrowing space adapted to receive an operator displaceable axially inward from outside said housing, said camming surface being shaped to deflect said resilient means laterally for effecting disengagement of said latching surfaces upon said inward displacement of said operator, whereby the brush holder can be withdrawn out of the guideway means.

2. Apparatus according to claim 1 wherein said holder includes at least one leg extending alongside said brush in said guideway means and providing said resilient means, said one latching surface being located adjacent the inner end of said leg and facing outwardly, said other latching surface being located on said guideway means and facing inwardly, said camming surface being located on said leg and tapering laterally toward said guideway means from a location adjacent the outside of the housing.

3. Apparatus according to claim 2 wherein said holder includes a base overlying the outer end of the brush, at least another leg like in construction to said one leg, said legs depending from said base in parallel relation with one another and defining a recess therebetween to accomodate said brush.

4. Apparatus according to claim 3 wherein said spring means has double coils connected by a web extending along opposite sides of said brush and engaging its outer end, and said legs have lower-most surfaces inclined outwardly and toward said brush for engaging said coils when said holder is seated in said guideway means.

5. Apparatus according to claim 3 wherein said guideway means has a predetermined transverse cross-section and said base has a like cross-section to provide a closure for said guideway means when said holder is mounted therein.

6. A brush holder for an electric machine having an armature and guideway means adapted to slidably receive said brush holder and to provide latching surfaces adjacent said armature, said brush holder comprising: a base adapted to overlie one end of a brush, a pair of legs depending in spaced relation from said base and adapted to extend along opposite sides of said brush, each leg having a laterally extending outwardly facing surface remote from said base for engaging said latching surfaces in said electric machine, said legs being resiliently deflectable laterally toward one another, said legs having opposite edge surfaces each with a groove extending longitudinally therein and becoming progressively shallower as the distance from said base increases.

7. A brush holder according to claim 6 wherein said base has a peripheral edge with a pair of recesses iin said edge in registry with said grooves.

8. A brush holder according to claim 6 wherein said legs terminate in inclined confronting surfaces adapted to engage coils of a constant force spring.

9. A brush holder assembly for an electric machine, comprising: a base adapted to overlie one end of a brush, a pair of legs depending inwardly in spaced relation from said base and adapted to extend along opposite sides of said brush, at least one of said legs having a laterally extending outwardly facing latching surface remote from said base, a guideway means slidably receiving said legs and providing at least one complementary latching surface engageable by said latching surface on said one leg, said one leg being resiliently deflectable laterally toward the other, and means providing a camming surface extending on said one leg opposite said guideway means for defining therebetween an inwardly and laterally narrowing space adapted to receive an operator displaceable axially alongside said one leg toward its latching surface to effect disengagement of said latching surfaces from one another.

* * * * *